Oct. 13, 1953  R. J. AYRES ET AL  2,655,642
COURTESY WARNING DEVICE FOR MOTOR VEHICLES
Filed June 26, 1950
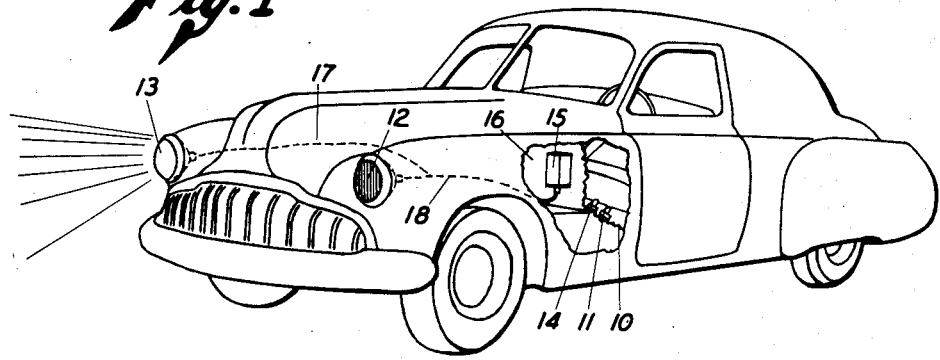
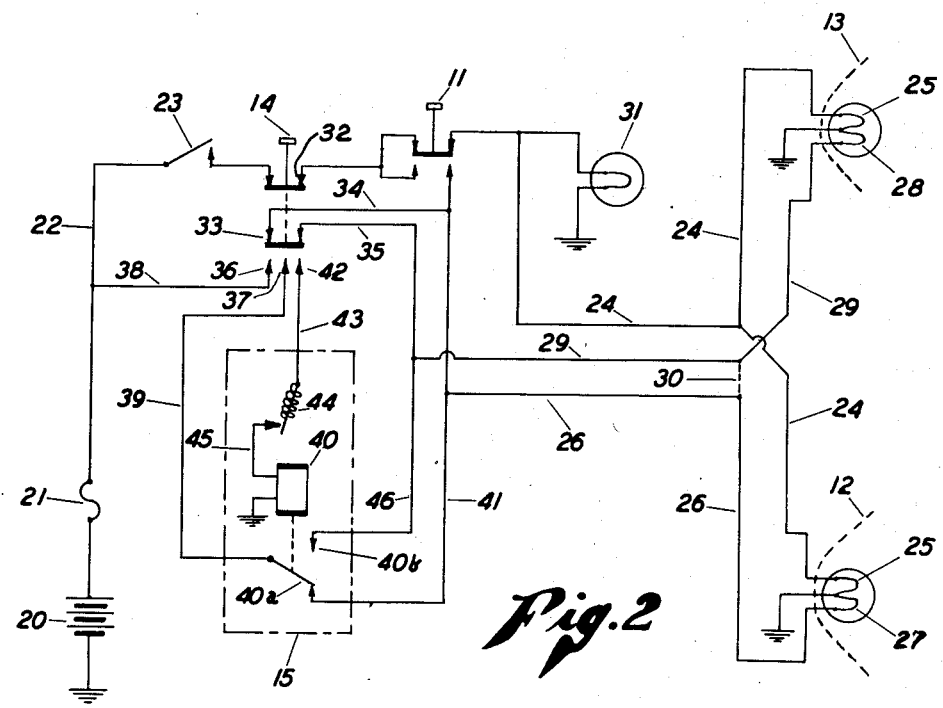
INVENTORS.
ROBERT J. AYRES
DONALD G. GUMPERTZ
BY
ATTORNEYS.

Patented Oct. 13, 1953

2,655,642

UNITED STATES PATENT OFFICE 2,655,642

COURTESY WARNING DEVICE FOR MOTOR VEHICLES

Robert J. Ayres, Los Angeles, and Donald G. Gumpertz, North Hollywood, Calif.; said Gumpertz assignor to said Ayres Application June 26, 1950, Serial No. 170,328

12 Claims. (Cl. 340—83)

This invention relates to a signaling apparatus, and has particular reference to a courtesy warning device which is particularly adapted for use on motor vehicles to give warning to approaching vehicles of hidden dangers or obstructions in the path of the oncoming vehicle.

It often happens in the operation of motor vehicles such as automobiles, trucks and buses that it is desired as a matter of courtesy and public service to warn the operators of approaching vehicles of certain hazardous conditions shortly to be encountered. For example, the operator of the oncoming vehicle may, without other warning, be approaching a stalled car or truck blocking all or part of the highway, the road may be washed out or partially blocked by fallen timber, the road may be blocked or rendered only dangerously passable by a prior accident, or the way may be obstructed by animals wandering on the highway. Under present driving conditions, it is not possible to give the drivers of oncoming vehicles warning of such hazardous conditions because of the high relative speeds of the vehicles and the lack of any intercommunication facilities for passing this information along to the other driver.

The present invention is directed to the provision of a warning device which is particularly adapted for installation on motor vehicles, and which may be operated to produce a distinctive signal clearly visible to the operator of an oncoming car. The signal produced is unlike any signal which can be given with the parts, devices or accessories now carried by motor vehicles of conventional construction, and has inherent attention-arresting properties serving to alert all operators, including those not actually acquainted with the full significance of the signal. In a relatively short time, and as a result of use, observation and publicity, nearly all operators will come to know the intended meaning of the signal. In order that the invention may become widely used in a short time, the apparatus has been made simple and inexpensive and so arranged as to be readily and easily installed on nearly all types of vehicles.

It is accordingly an object of this invention to provide a warning device for use on motor vehicles which operates to produce a distinctive visible signal.

It is another object of this invention to produce a warning device of the character set forth in the preceding paragraph which, when operated, causes repetitive alternate energization of a pair of spaced light sources carried by the vehicle.

It is another object of this invention to provide a warning device of the character hereinbefore described which includes a control mechanism operable to repeatedly and alternately energize a pair of spaced light sources, regardless of whether said sources are energized at the time said control mechanism is operated.

It is a still further object of this invention to provide a warning device as set forth in the preceding paragraphs which includes a control mechanism adapted for connection to a pair of forwardly directed lamps carried by a motor vehicle, and which is operable to repeatedly and alternately energize said lamps, regardless of whether said lamps are energized at the time said mechanism is operated.

It is also an object of this invention to provide a warning device of the character set forth in the preceding paragraphs which is arranged for connection to the pair of conventional dual-filament headlamps carried by a motor vehicle, and which is operable to repeatedly and alternately energize the low beam filaments of said lamps.

It is another object of this invention to provide an apparatus of the character set forth in the preceding paragraph which is operable to so energize said low beam filaments, regardless of whether either or neither of the filaments of said lamps is normally energized at the time of the operation of the control mechanism.

It is an additional object of this invention to provide a mechanism of the character hereinbefore described which is arranged as an inexpensive attachment device or accessory capable of ready and simple installation on a motor vehicle of substantially any make or model.

Other objects and advantages of this invention will be apparent from a consideration of the following specification, read in connection with the accompanying drawings, wherein:

Fig. 1 is a perspective view of a motor vehicle of conventional construction, with a part of the body broken away to show the installation of the warning device of this invention; and Fig. 2 is a wiring diagram illustrating the electrical components used in the apparatus and their manner of interconnection with the electrical apparatus normally carried by a motor vehicle.

Referring to the drawings, there is illustrated in Fig. 1 an automobile of conventional construction, an automobile being selected for illustration as the type of motor vehicle most commonly encountered on the roadways of this country. In Fig. 1 a part of the body of the motor vehicle has been broken away to show the floorboard 10 upon which is mounted a foot switch 11 connected in a conventional electric circuit with a pair of headlamps 12 and 13 and conventionally arranged to transfer the energization of the dual filaments of those headlamps from the high beam filament to the low beam filament so as to depress the beams when meeting an oncoming motor car.

On the floorboard 10 and preferably adjacent the foot switch 11 there is mounted a control switch 14 also adapted for foot operation and used as the initiating device with the instrumentalities later to be described for producing a warning signal capable of warning the operators of oncoming vehicles that an obstruction or other hazardous condition is soon to be encountered. The switch 14 is connected by wires (not shown) to certain control apparatus which may be housed within a suitable housing 15 mounted upon the bulkhead or firewall 16 normally separating the driver's compartment from the engine compartment in normal vehicle construction. Electrical connections to be described hereinafter and represented in Fig. 1 by the dotted lines 17 and 18 are extended from the control unit 15 to the headlights 12 and 13.

As will later be made more apparent, the mechanism is so arranged that depression of the foot switch 14 will cause alternate energization of the low beam filaments of the headlamps 12 and 13 so long as the switch 14 is depressed, and regardless of whether the headlights are turned on for normal use and regardless of whether the foot switch 11 is in the low beam or high beam position. Such an adaptation of the device of this invention to a conventional motor vehicle has been selected as illustrative of the preferred embodiment of this invention, but it will be appreciated that the device may be electrically connected with any pair of spaced, forwardly directed lamps such as the parking lamps or fog lights sometimes mounted on the forward portion of an automobile. Alternatively, special forwardly directed light sources may be used if desired. However, the interconnection of the device with the ordinary headlamps of the automobile is preferred because of the simplicity of installation and because these headlamps produce the most intense forwardly directed beams of light which can legally be projected from a motor vehicle.

Fig. 2 illustrates by means of an electrical wiring diagram the apparatus contained within the casing 15 and its manner of interconnection with the foot switch 14 and with the other conventional apparatus usually connected in circuit with the headlights 12 and 13. In Fig. 2 the usual automotive storage battery is represented at 20 as having one terminal grounded and the other terminal connected through a fuse 21 and by way of conductor 22 to the headlight switch 23 which is usually mounted on the dashboard of the vehicle and used to turn off and on the headlamps 12 and 13. Conventionally, the switch 23 is connected to the high-low foot switch 11 arranged in one of its positions as shown on the drawing to connect the ungrounded terminal of the battery to a high beam conductor 24 which is connected to the high beam filament 25 of both of the headlamps 12 and 13, the other terminal of said filaments being grounded as shown. The conventional electric installation in an automobile includes a pilot indicator 31 connected between the high beam conductor 24 and ground so as to indicate to an operator of the automobile that the high beams are in use.

In the alternate position of the foot switch 11, the ungrounded terminal of the battery 20 is connected to a low beam conductor 26 which is in turn connected to the low beam filament 27 of the headlamp 12, the other terminal of said filament being grounded. Conventionally, the low beam filament 28 of the headlamp 13 is also connected as by a conductor 29 and as shown by the dotted-line connection 30 in parallel with the low beam filament 27 so that when the foot switch 11 is moved to the position alternate to that shown in Fig. 2, both of the low beam filaments 27 and 28 are energized. It will be understood, however, that in the installation of the signaling device of this invention, the connection 30 is opened so as to maintain the conductors 26 and 29 electrically separate.

A normally closed contact 33 of the foot switch 14 is used to interconnect through conductors 34 and 35 the low beam conductors 26 and 29 so as to cause the simultaneous energization of both low beam filaments 27 and 28 when the switch 14 is in its normal position and the high-low switch 11 is moved to the position alternate to that shown in Fig. 2.

As before mentioned, the foot switch 14 of the signaling device of this invention operates to supersede the normal control of the headlights 12 and 13, and to this end normally closed contacts 32 of the switch 14 are connected in series between the switch 23 and the high-low switch 11. Thus, when the switch 14 is depressed, the circuit is opened between the switch 23 and the foot switch 11, and the switch contacts 33 are opened so as to electrically separate the conductors 26 and 29. At the same time a connection is established between foot switch contacts 36 and 37 to complete a circuit extending from the battery 20 through conductor 22, conductor 38, switch contacts 36, 37, conductor 39, normally closed contacts 40a of a relay 40, and conductor 41 to the low beam conductor 26 so as to energize the low beam filament 27 of the headlamp 12. The opening of the contacts 32 and 33 of the switch 14 deenergizes all other filaments of the two lamps 12 and 13 so that at the instant now considered, only the filament 27 is energized.

Operating the foot switch 14 also completes an electric circuit between contacts 36 and 42 thereof so as to complete an electric circuit extending from battery 20 through conductor 22, conductor 38, switch contacts 36, 42, conductor 43, a thermal flasher switch 44, and conductor 45 to the coil of relay 40 to energize the relay 40. Energization of relay 40 closes normally open contacts 40b thereof, thus completing a circuit between conductor 39 and low beam conductor 29 through a conductor 46, and opening the circuit between conductors 39 and 41. This deenergizes the low beam filament 27, and energizes the low beam filament 28 so that as seen from an oncoming vehicle the headlamp 12 goes out and the headlamp 13 comes on.

The thermal flasher switch 44 is of usual and conventional construction, and includes a thermal element heated by the passage of the current through the switch and operating after a definite time to open a circuit between contacts provided for that purpose. The opening of the circuit allows the thermal element to cool, and allows the contacts to reclose. Thus, all during the time the foot switch 14 is pressed, the relay 40 is alternately energized and deenergized by the alternating operation of the thermal flasher unit 44. The alternating operation of the relay 40 alternately connects the conductor 39 to the conductors 41 and 46 so as to cause the low beam filaments 27 and 28 to be alternately energized in a repetitive fashion so long as the foot switch 14 is held in its closed position.

The resulting alternate flashing of the headlamps 12 and 13 comprises a signal of distinctive character which is immediately recognized by the operator of an approaching vehicle. This type of operation results from the depression of the foot switch 14 regardless of whether the main light switch 23 is open or closed, and regardless of the position of the high-low foot switch 11. However, when the foot switch 14 is released, normal operation is reestablished through the closing of the contacts 32 and 33 so that both of the headlamps 12 and 13 are steadily illuminated to emit either their higher or low beams, depending upon the then position of the switch 11.

From the foregoing it will be observed that the invention illustrated and described herein provides for giving the operator of an oncoming vehicle a distinctive warning signal which may be used to apprise said operator of dangerous or hazardous conditions shortly to be reached. It will be noted that the signal given is of a distinctive character and of a type which cannot be given through the normal operation of the instrumentalities and accessories normally comprised in a conventional motor vehicle.

Attention is directed particularly to the fact that the apparatus is so constructed and arranged as to permit it to be manufactured as an attachment device and installed at extremely low cost. The three instrumentalities comprising the attachment device are the foot-operated switch 14, the relay 40, and the thermal flashing unit 44. Installation as an attachment is simplified by mounting the relay 40 and flasher unit 44 within the container 15 and by pre-assembling the device to the extent of installing the electrical connections between the switch 14 and the apparatus contained within the housing 15.

While the preferred embodiment of this invention has been illustrated and described herein, the same is not to be limited to the details shown and described, except as defined in the appended claims.

We claim:

1. In a courtesy warning device for motor vehicles, the combination of: a pair of spaced and forwardly directed lamps; a source of electric power for energizing said lamps; circuits for connecting said source to each of said lamps; control means in said circuits for connecting said source alternately and repeatedly to said lamps in response to actuation of said control means; and means for actuating said control means.

2. In a courtesy warning device for motor vehicles, the combination of: a pair of spaced and forwardly directed lamps; a source of electric power for energizing said lamps; a circuit normally connecting said source to both of said lamps; a switch in said circuit for normally controlling the energization of said lamps; control means connected in circuit between said source and said lamps for connecting said source first to one of said lamps and then to the other alternately and repeatedly independently of said switch and in response to actuation of said control means; and means for actuating said control means.

3. In a courtesy warning device for motor vehicles, the combination of: a pair of spaced and forwardly directed lamps; a source of electric power for energizing said lamps; a control switch connected between said source and both of said lamps and actuatable from a first position connecting said source to one of said lamps to a second position connecting said source to the other of said lamps; control means for repeatedly actuating said control switch in response to operation of said control means to thereby cause repetitive alternate energization of said lamps; and means for operating said control means.

4. In a courtesy warning device for motor vehicles, the combination of: a pair of spaced and forwardly directed lamps; a source of electric power for energizing said lamps; a relay including a normally closed first switch and a normally open second switch and having a coil operable when energized to open said first switch and close said second switch; a first circuit including said first switch connecting said source to one of said lamps; a second circuit including said second switch connecting said source to the other of said lamps; a control circuit connecting said coil to said source; a control switch in said control circuit; and a thermal flasher switch in said control circuit for alternately energizing and deenergizing said coil while said control switch is closed.

5. In a courtesy warning device for motor vehicles, the combination of: a pair of spaced and forwardly directed lamps, each including a dual filament light source comprising a high beam filament and a low beam filament; a source of electric power for energizing said filaments; a high beam conductor interconnecting said high beam filaments; a low beam conductor for each of said low beam filaments; a main switch connected to said source; a selector switch connected to said main switch operable in one position to connect said main switch to said high beam conductor and operable in another position to connect said main switch to both of said low beam conductors; a control mechanism actuatable to connect said source alternately and repeatedly first to one of said low beam conductors and then to the other; and a control switch operable to actuate said mechanism, said control switch including normally closed contacts connected in circuit with said selector switch for preventing energization of said filaments through said selector switch when said control switch is operated.

6. As a courtesy warning device for motor vehicles having a pair of spaced and forwardly directed lamps, a source of electric power, and a main switch connected in circuit between said source and said lamps, an attachment device comprising: a relay including a normally closed first switch and a normally open second switch and having a coil operable when energized to open said first switch and close said second switch; a first conductor for connecting said first switch in circuit between said source and one of said lamps; a second conductor for connecting said second switch in circuit between said source and the other of said lamps; a control switch; a thermal flasher switch; a circuit connecting said control switch and said thermal flasher switch in series with said coil; and a conductor for connecting said circuit to said source of electric power.

7. As a courtesy warning device for motor vehicles having a pair of spaced and forwardly directed lamps, each including a dual filament light source comprising a high beam filament and a low beam filament, one terminal of each of said filaments being grounded, a high beam conductor interconnecting ungrounded terminals of said high beam filaments, a low beam conductor for the ungrounded terminals of each of said low beam filaments, a source of electric power having a grounded terminal and an ungrounded terminal, and a power circuit extending from the ungrounded terminal of said source of power through a main switch to a selector switch operable in one position to connect said source to said high beam conductor and operable in another position to connect said source to one of said low beam conductors, an attachment device comprising: a relay including a normally closed first switch to be connected to one of said low beam conductors and including a normally open switch to be connected to the other of said low beam conductors, said relay also including a coil having one terminal grounded and operable when energized to close said first switch and open said second switch; a thermal flasher switch connected to the ungrounded terminal of said coil; and a control switch having a first set and a second set of normally open contacts to be connected to the ungrounded terminal of said source, said first set of normally open contacts being connected to said flasher switch and said second set of normally open contacts being connected to said first and second switches of said relay, said control switch also having two sets of normally closed contacts, one for connection in series in said power circuit and the other for connection between said low beam conductors.

8. In a courtesy warning device for motor vehicles, the combination of: a pair of spaced and forwardly directed lamps; a source of electric power for energizing said lamps; a relay including a normally closed first switch and a normally open second switch and having a coil operable when energized to open said first switch and close said second switch; a first circuit including said first switch connecting said source to one of said lamps; a second circuit including said second switch connecting said source to the other of said lamps; a control circuit connecting said coil to said source; a control switch in said control circuit; and an interrupter in said control circuit for alternately completing and interrupting said control circuit to thereby alternately energize and deenergize said coil while said control switch is closed.

9. As a courtesy warning device for motor vehicles having a pair of spaced and forwardly directed lamps, a source of electric power, and a main switch connected in circuit between said source and said lamps, an attachment device comprising: a relay including a normally closed first switch and a normally open second switch and having a coil operable when energized to open said first switch and close said second switch; a first conductor for connecting said first switch in circuit between said source and one of said lamps; a second conductor for connecting said second switch in circuit between said source and the other of said lamps; a control switch; an interrupting device operating automatically to repeatedly open and close an electric circuit therethrough; a circuit connecting said control switch and said interrupting device in series with said coil; and a conductor for connecting said circuit to said source of electric power.

10. As a courtesy warning device for motor vehicles having a pair of spaced and forwardly directed lamps, a source of electric power, and a main switch connected in circuit between said source and said lamps, an attachment device comprising: a normally closed first switch and a normally open second switch; a first conductor for connecting said first switch in circuit between said source and one of said lamps; a second conductor for connecting said second switch in circuit between said source and the other of said lamps; a thermal flasher unit operable when energized to cause repetitive simultaneous operation of said first and second switches; a control switch; a circuit connecting said control switch to said thermal flasher unit; and a conductor for connecitng said circuit to said source of electric power.

11. In a courtesy warning device for motor vehicles, the combination of: a pair of spaced and forwardly directed lamps; a source of electric power for energizing said lamps; a first circuit means connecting said source to both of said lamps; a main switch connected in said first circuit means between said source and both of said lamps movable from an off position to an on position normally causing energization of both of said lamps; a control switch actuatable between a first position and a second position; second circuit means connecting said source to one of said lamps independently of said main switch in said first position of said control switch and connecting said source to the other of said lamps independently of said main switch in said second position of said control switch; actuating means operable to repeatedly actuate said control switch; and control means for operating said actuating means, whereby operation of said actuating means causes repetitive alternate flashing of said lamps regardless of the position of said main switch.

12. In a courtesy warning device for motor vehicles, the combination of: a pair of spaced and forwardly directed lamps; a source of electric power for energizing said lamps; a first circuit means connecting said source to both of said lamps; a main switch connected in said first circuit means between said source and both of said lamps movable from an off position to an on position normally causing energization of both of said lamps; a control switch actuable between a first position and a second position; second circuit means connecting said source to one of said lamps independently of said main switch in said first position of said control switch and connecting said source to the other of said lamps independently of said main switch in said second position of said control switch; a thermal flasher unit operable when energized to repeatedly actuate said control switch; and control means for energizing said thermal flasher unit, whereby operation of said thermal flasher unit causes repetitive alternate flashing of said lamps regardless of the position of said main switch.

ROBERT J. AYRES.
DONALD G. GUMPERTZ.

References Cited in the file of this patent

UNITED STATES PATENTS

| Number | Name | Date |
| --- | --- | --- |
| 1,152,219 | Reinker | Aug. 31, 1915 |
| 2,186,911 | Erickson | Jan. 9, 1940 |
| 2,203,502 | Michel | June 4, 1940 |
| 2,300,896 | Hosmer | Nov. 3, 1942 |
| 2,304,963 | Smith | Dec. 14, 1942 |